3,044,882
PROCESS FOR PROTECTION OF CHLOROPHYLL DURING COOKING OF GREEN VEGETABLES
James P. Sweeney and Margaret E. Martin, Silver Spring, Md., assignors to the United States of America as represented by the Secretary of Agriculture
No Drawing. Filed July 21, 1961, Ser. No. 125,878
1 Claim. (Cl. 99—103)
(Granted under Title 35, U.S. Code (1952), sec. 266)

A non-exclusive, irrevocable, royalty-free license in the invention herein described, for all governmental purposes, throughout the world, with the power to grant sublicenses for such purposes, is hereby granted to the Government of the United States of America.

This invention relates to a process for protecting chlorophyll $a$ from destruction during the cooking of a green vegetable containing same thereby to maintain the color of the vegetable using the procedure in the article entitled "Stability of Chlorophyll in Vegetables as Affected by pH" by James P. Sweeney and Margaret E. Martin, appearing in "Food Technology," vol. 15, No. 5, pp. 263–266, 1961.

Approximately 75% of the green coloring matter in plants, such as green vegetables, is in the form of the blue-green chlorophyll $a$, the remainder being chiefly the yellow-green chlorophyll $b$.

We have found that green vegetables, such as spinach, green peas, broccoli, Lima beans, green beans, and Brussels sprouts, differ greatly in their ability to retain chlorophyll $a$ when cooked, and that the chlorophyll $a$ is destroyed more rapidly than the chlorophyll $b$ during the cooking process.

We have found further that an interrelationship exists between the retention of the chlorophyll $a$ and the pH of the aqueous medium in which the green vegetable is cooked and that a pH ranging from 6.8 to 7.0 is required for maximum chlorophyll $a$ retention in the resulting cooked vegetable.

According to the invention, we have discovered that such a pH range is produced and maintained in the vegetable and water, preferably in equal weights, when there is mixed therewith prior to cooking, citrate-phosphate buffer of about pH 6.8. Such a buffer, known as McIlvaine's buffer, consists of 0.1 molar citric acid and 0.2 molar disodium phosphate, a buffer of pH 6.8 being prepared by mixing 4.55 ml. citric acid with 15.45 ml. disodium phosphate.

As a result of such buffering of the vegetable and water to a pH within the range of 6.8 to 7.0, maximum retention of chlorophyll $a$ is obtained thereby maintaining the color of the vegetable.

In carrying out the process of the invention, a green vegetable containing chlorophyll $a$ is soaked in a solution of water and a sufficient quantity of a citrate-phosphate buffer, e.g., McIlvaine's buffer, for about 10 minutes to produce and maintain a pH of 6.8 to 7.0 in the vegetable and then draining the resulting buffered solution from the vegetable. The vegetable is subsequently cooked in water containing about 5%, by volume, of the drained buffer solution, that is, about 5 ml. per 95 ml. of water, to obtain a cooked green vegetable in which a high percentage of the original chlorophyll $a$ has been retained.

We have found, also, that there was a sharp decrease in panel flavor scores when such buffer of pH greater than pH 7 was employed. On the other hand, such buffers having pH's in excess of 7 caused relatively little additional increase in green color, as indicated by $a_L/b_L$ values. In this ratio, which expresses color, the $a_L$ value is a measure of green reflected color and $b_L$ is a measure of yellow reflected color, readings being taken on a Gardner automatic color difference meter in which a Gardner medium green color standard, L 50.0, $a_L$ −25.7, and $b_L$ +7.3 were used. The chlorophyll $a$ retention values were determined by the chromatographic procedure described in the article entitled "Determination of Chlorophyll and Pheophytin in Broccoli Heated by Various Procedures," by James P. Sweeney and Margaret Martin, appearing in "Food Research," vol. 23, No. 6, pp. 635–647, 1958.

It was found further that the buffer employed had no adverse effect on retention of ascorbic acid (vitamin C) in the vegetable.

The following examples are illustrative of the invention.

EXAMPLE 1

In this example, chlorophyll $a$ retention after cooking was determined on samples of each of six frozen vegetables, specifically, broccoli spears, Brussels sprouts, cut green beans, Fordhook Lima beans, green peas, and spinach.

In the preparation and cooking procedures, family-size packages of each brand of the vegetable to be tested were removed from the freezer and opened. Those to be tested without cooking were allowed to thaw at room temperature for about one hour.

The samples to be cooked (two packages of each brand) were weighed. A predetermined amount of water (177 g. for spinach, Lima beans, Brussels sprouts, and broccoli; 188 g. for peas; 236 g. for green beans) was brought to a boiling temperature, as determined by thermocouple, in each of four 4-quart glass-covered saucepans. The unthawed vegetable was placed in the boiling water and timing was begun when the cooking water returned to boiling. The cooking times selected were those that had been shown by panel evaluation to result in vegetables of near optimum texture. The results are shown in the following Table 1.

Table 1
EFFECT OF COOKING TIME AND pH ON RETENTION OF CHLOROPHYLL $a$

| Vegetable | Cooking time (min.) | Chlorophyll retained as $a$ (percent) |
|---|---|---|
| Spinach | 0 | 78.0 |
|  | 5 | 76.0 |
|  | 10 | 67.3 |
|  | 15 | 67.1 |
|  | 20 | 66.6 |
| Green peas | 0 | 64.9 |
|  | 5 | 60.8 |
|  | 10 | 60.2 |
|  | 15 | 56.6 |
|  | 20 | 55.3 |
| Broccoli | 0 | 66.9 |
|  | 5 | 63.8 |
|  | 10 | 51.4 |
|  | 15 | 50.0 |
|  | 20 | 39.4 |
| Lima beans | 0 | 69.2 |
|  | 5 | 64.3 |
|  | 10 | 54.9 |
|  | 15 | 42.1 |
|  | 20 | 39.5 |
| Brussels sprouts | 0 | 76.5 |
|  | 5 | 57.1 |
|  | 10 | 50.1 |
|  | 15 | 45.5 |
|  | 20 | 32.4 |
| Green beans | 0 | 70.1 |
|  | 5 | 46.8 |
|  | 10 | 44.3 |
|  | 15 | 41.1 |
|  | 20 | 27.2 |

The data of this table indicate that chlorophyll $a$ is destroyed when the vegetable is cooked, and that the destruction is preferential in the more acidic vegetables (green beans and Brussels sprouts).

EXAMPLE 2

Experiments were also run to determine the effect of pH on chlorophyll *a* retention. In this procedure, the vegetables were prepared by blending with an equal weight of distilled water. The pH readings were taken with a pH meter and the chlorophyll *a* retention values determined as for Example 1. The results obtained are summarized in the following Table 2.

*Table 2*

PERCENTAGE RETENTION OF CHLOROPHYLL IN FROZEN VEGETABLES AS AFFECTED BY pH

| Vegetables | Uncooked | | Cooked | | Cooking time [1] (min.) |
|---|---|---|---|---|---|
| | Chlorophyll retention [2], percent | pH [3] | Chlorophyll retention [2], percent | pH [3] | |
| Spinach | 90.0 | 6.8 | 77.2 | 6.7 | 9 |
| Peas | 89.8 | 7.0 | 67.6 | 6.7 | 10 |
| Broccoli | 81.4 | 6.5 | 44.9 | 6.4 | 12 |
| Fordhook lima beans | 72.5 | 6.5 | 40.1 | 6.5 | 13 |
| Green beans | 76.6 | 6.2 | 26.7 | 6.0 | 16 |
| Brussels sprouts | 69.0 | 6.3 | 20.7 | 6.2 | 13 |

[1] The cooking time in each case was that required for optimum texture.
[2] Mean of 64 samples.
[3] Mean of 4 samples for all vegetables except green beans; values for green beans, mean of 10 samples.

As shown by Table 2, vegetables having the lowest pH lose chlorophyll *a* most rapidly when cooked. This is shown by the fact that cooked spinach and peas (pH 6.7) retained 77.2 and 67.6% of their chlorophyll *a* as compared to only 20.7 and 26.7% retention in Brussels sprouts and green beans at pH 6.2 and 6.0.

EXAMPLE 3

A study of the effect of pH on color retention in frozen cut green beans was made. In this study, a modified cooking method was employed over that of Example 1. In this modified method, samples were allowed to thaw at room temperature and 70-gram portions were soaked for 10 minutes in the following solutions of chemical additives in amounts sufficient to cover the vegetable: (1) distilled water; (2) 10% monosodium glutamate of pH 6.8; and (3) McIlvaine's citrate-phosphate buffer of pH 6.8 (described previously). The vegetables were drained, 5 ml. of the drained liquid added to 95 ml. boiling distilled water and the sample cooked in this liquid for 5 minutes. The $a_L$ and $b_L$ values of the cooked beans was evaluated by the Gardner automatic color difference meter (previously described), and pH measurements were taken on aqueous slurries.

The results are given in Table 3 hereafter:

*Table 3*

EFFECT OF CHEMICAL ADDITIVES ON COLOR RETENTION IN CUT GREEN BEANS WHEN COOKED

| Cooking time (min.) | Chemical added | pH of vegetable slurry | $a_L/b_L$ value |
|---|---|---|---|
| 0 | None | 6.30 | 0.76 |
| 5 | None | 6.25 | 0.48 |
| 5 | Monosodium glutamate | 6.40 | 0.55 |
| 5 | Citrate-phosphate buffer | 6.85 | 0.63 |

EXAMPLE 4

An experiment, similar to that of Example 3, was carried out in which samples of green beans (French style) were soaked in water, buffered with citrate-phosphate buffer at various pH's, namely, pH 6.2, 6.6, and 6.9, and then cooked as described in Example 3 in water to which 5 ml. of the buffered solution had been added.

The results are shown in Table 4 hereafter:

*Table 4*

EFFECT OF pH ADJUSTMENT ON RETENTION OF CHLOROPHYLL *a* IN FROZEN GREEN BEANS WHEN COOKED

| Cooking time (min.) | Chemical added | pH of vegetable slurry | Chlorophyll retained as *a* (Percent) | $a_L/b_L$ values |
|---|---|---|---|---|
| 0 | None | 6.1 | 57.0 | 0.76 |
| 5 | None | 6.4 | 33.9 | 0.57 |
| 5 | Citrate-phosphate-buffer, pH 6.8 | 6.2 | 31.9 | 0.49 |
| 5 | do | 6.6 | 42.0 | 0.67 |
| 5 | do | 6.9 | 50.0 | 0.71 |

The results shown in Table 4 indicate improved retention in color in cooked green beans with each increase in pH of the buffer. This is indicated by the higher retention of chlorophyll *a* (50% in green beans cooked in water buffered at pH 6.9 as compared to 31.9% buffered at 6.2) and by a corresponding increase in $a_L/b_L$ values to 0.71 from 0.49.

EXAMPLE 5

In further study on the effects of buffers ranging in pH from 6.4 to 8.90 on color and flavor of green beans, two 10-ounce packages of frozen green beans were allowed to thaw and were then immersed for 10 minutes in buffers, drained, and cooked until done in 225 ml. boiling water to which 25 ml. of the drained buffer had been added. Buffers ranging from pH 6.40 to 8.90 were used. In addition, uncooked samples and samples cooked in water containing no added buffer were tested. Color difference meter and pH readings were taken as in Example 4. Flavor was evaluated by panel flavor scores, the flavor of the cooked vegetable being rated by a trained panel of five members, with a five point rating scale being used ranging from a score of 5 denoting natural full flavor to 1 denoting weak or lacking flavor. The color was evaluated as previously described, with a Gardner automatic color difference meter.

The results are given in the following Table 5.

*Table 5*

EFFECT OF pH ADJUSTMENT ON COLOR AND FLAVOR OF FROZEN GREEN BEANS WHEN COOKED

| Cooking time (min.) | pH of buffer | pH of vegetable slurry | $a_L/b_L$ value | Panel flavor score |
|---|---|---|---|---|
| 15.00 | Control (no buffer) | 6.00 | 0.50 | 4.1 |
| 10.00 | 6.40 | 6.55 | 0.71 | 3.8 |
| 7.00 | 6.60 | 6.65 | 0.75 | 3.8 |
| 5.00 | 6.80 | 6.64 | 0.74 | 3.8 |
| 5.00 | 7.00 | 6.73 | 0.79 | 3.8 |
| 5.00 | 7.20 | 6.82 | 0.85 | 3.0 |
| 4.50 | 7.60 | 7.04 | 0.84 | 1.8 |
| 3.00 | 8.40 | 7.20 | 0.88 | 1.8 |
| 1.75 | 8.90 | 7.10 | 0.81 | 2.4 |

The results shown in this table indicate that there is a sharp decrease in panel flavor score when buffers of pH greater than 7 were used. On the other hand, buffers of pH more than 7 caused little additional increase in green color, as indicated by the $a_L/b_L$ values.

EXAMPLE 6

In a further study on the effects of buffers ranging in pH from 6.40 to 8.40 on color and ascorbic acid retention of green beans, one pound of fresh green beans was cooked using the same procedure as that denoted in Example 5 above.

The results are given in Table 6 hereafter:

Table 6

EFFECT OF pH ADJUSTMENT ON COLOR AND ASCORBIC ACID IN FRESH GREEN BEANS WHEN COOKED

| Cooking time (min.) | pH of buffer | pH of vegetable slurry | $a_L/b_L$ value | Ascorbic acid (mg./100 g.) |
|---|---|---|---|---|
| 0 | No buffer | 6.05 | 0.67 | 11.8 |
| 20 | Control (no buffer) | 5.80 | 0.39 | 9.3 |
| 17 | 6.40 | 6.15 | 0.42 | 9.2 |
| 10 | 7.00 | 6.40 | 0.67 | 9.3 |
| 10 | 8.00 | 6.65 | 0.75 | 9.3 |
| 10 | 8.40 | 6.65 | 0.73 | 9.4 |

The ascorbic acid reduction was determined by the procedure of Bessey and King, J. Biol. Chem., 103, 687 (1935).

As is apparent from the data of Table 6, buffer pH's ranging from 6.4 to 8.4 had no adverse effect on ascorbic and retention.

We claim:

A process comprising soaking a green vegetable containing chlorophyll $a$ in a solution of water and a sufficient quantity of a citrate-phosphate buffer for about 10 minutes to produce and maintain a pH of 6.8 to 7.0 in the vegetable, draining the buffered solution from the vegetable, and subsequently cooking the vegetable in water containing about 5%, by volume, of the drained buffer solution, to obtain a cooked green vegetable in which a high percentage of the original chlorophyll $a$ in the vegetable has been retained.

References Cited in the file of this patent

Beeton: "Book of Household Management," 1869, page 592.

De Gouy: "The Gold Cook Book," 1947, page 697.